United States Patent
Talaski et al.

(10) Patent No.: US 6,343,589 B1
(45) Date of Patent: Feb. 5, 2002

(54) FUEL SYSTEM WITH JET PUMP SWITCHING REGULATOR

(75) Inventors: Edward J. Talaski, Caro; Ronald B. Kuenzli, Deford; Joseph M. Ross, Millington, all of MI (US)

(73) Assignee: Walbro Corporation, Cass City, MI (US)

( * ) Notice: Subject to any disclaimer, the term of this patent is extended or adjusted under 35 U.S.C. 154(b) by 0 days.

(21) Appl. No.: 09/495,676

(22) Filed: Feb. 1, 2000

(51) Int. Cl.$^7$ ............................................... F02M 37/04
(52) U.S. Cl. ........................ 123/514; 123/509; 137/508
(58) Field of Search ................................. 123/514, 509, 123/457, 463, 456; 137/508, 115

(56) References Cited

U.S. PATENT DOCUMENTS

| | | | | |
|---|---|---|---|---|
| 4,860,714 A | * | 8/1989 | Bucci ........................... | 123/514 |
| 5,289,810 A | * | 3/1994 | Bauer et al. ................. | 123/510 |
| 5,435,345 A | * | 7/1995 | Robinson et al. ........... | 137/508 |
| 5,469,829 A | * | 11/1995 | Kleppner et al. ........... | 123/514 |
| 5,590,631 A | | 1/1997 | Tuckey | |
| 5,692,479 A | * | 12/1997 | Ford et al. .................. | 123/514 |
| 5,791,317 A | * | 8/1998 | Eck .............................. | 123/510 |
| 5,842,455 A | | 12/1998 | Tuckey et al. | |
| 5,873,349 A | * | 2/1999 | Tuckey et al. .............. | 123/514 |
| 5,967,120 A | * | 10/1999 | Blanton et al. ............. | 123/467 |
| 6,129,074 A | * | 10/2000 | Frank .......................... | 123/509 |

* cited by examiner

*Primary Examiner*—Carl S. Miller
(74) *Attorney, Agent, or Firm*—Reising, Ethington, Barnes, Kisselle, Learman & McCulloch, P.C.

(57) ABSTRACT

A fuel pressure regulator is provided between the outlet of the fuel pump and an inlet of a jet pump to control the flow of fuel to the jet pump. Desirably, during low voltage conditions in a vehicle, the flow of fuel to the jet pump may be temporarily restricted or terminated to decrease the amount of fuel diverted from the engine and thereby increase the flow rate of fuel to the engine and improve the performance of the engine. The regulator may also function to bypass fuel delivered from the fuel pump in excess of the engine fuel demand to control the pressure of and limit the maximum pressure of fuel supplied to the engine.

18 Claims, 2 Drawing Sheets

FUEL SYSTEM WITH JET PUMP SWITCHING REGULATOR

FIELD OF THE INVENTION

This invention relates generally to vehicle fuel systems and more particularly to a fuel flow and pressure regulator for a fuel system with a jet pump.

BACKGROUND OF THE INVENTION

Electric motor fuel pumps have been used to supply the fuel demand for engines in various applications. In some applications, the fuel pump may be disposed within a reservoir within the fuel tank and may draw fuel directly from the reservoir for delivery to the engine. To provide fuel within the reservoir and available for the fuel pump, some of these fuel systems utilize a portion of fuel discharged under pressure from the fuel pump to operate a jet pump which creates a pressure drop adjacent an inlet of the reservoir to draw fuel from the fuel tank into the reservoir.

In prior fuel systems, the flow path providing fuel from the fuel pump to the jet pump is always fully open and therefore, a significant portion of fuel discharged from the fuel pump is always routed through the jet pump. Undesirably, during low voltage conditions, such as when the vehicle is started in cold weather, a lower than normal voltage may be provided to the fuel pump causing the fuel pump to run at a lower than normal speed and thereby discharge fuel at a relatively low flow rate. Thus, a lower flow rate of fuel is available for the engine, and to compound this problem, a portion of the fuel discharged from the fuel pump is routed away from the engine and to the jet pump as previously described. Thus, during low voltage conditions, an undesirably low fuel flow rate may be provided to the vehicle engine. Therefore, there is a need to improve the flow rate of fuel to the engine during low voltage and other conditions in the vehicle wherein the fuel pump has a low output flow rate.

SUMMARY OF THE INVENTION

In a fuel system a fuel pressure regulator is provided between the outlet of the fuel pump and an inlet of a jet pump to control the flow of fuel to the jet pump. Desirably, during low voltage conditions in a vehicle, the flow of fuel to the jet pump may be temporarily restricted or terminated to decrease the amount of fuel diverted from the engine and thereby increase the flow rate of fuel to the engine and improve the performance of the engine. The regulator may also function to bypass fuel delivered from the fuel pump in excess of the engine fuel demand to control the pressure of fuel downstream of the fuel pump delivered to the engine.

Objects, features and advantages of this invention include providing a fuel pressure regulator which controls the maximum pressure of fuel delivered to the engine, bypasses excess fuel discharged from the fuel pump, controls the flow of fuel to a jet pump, may restrict or terminate the flow of fuel to a jet pump during low voltage conditions, improves the performance of the engine during low voltage conditions, is reliable, durable, of relatively simple design and economical manufacture and assembly, and has a long, useful service life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
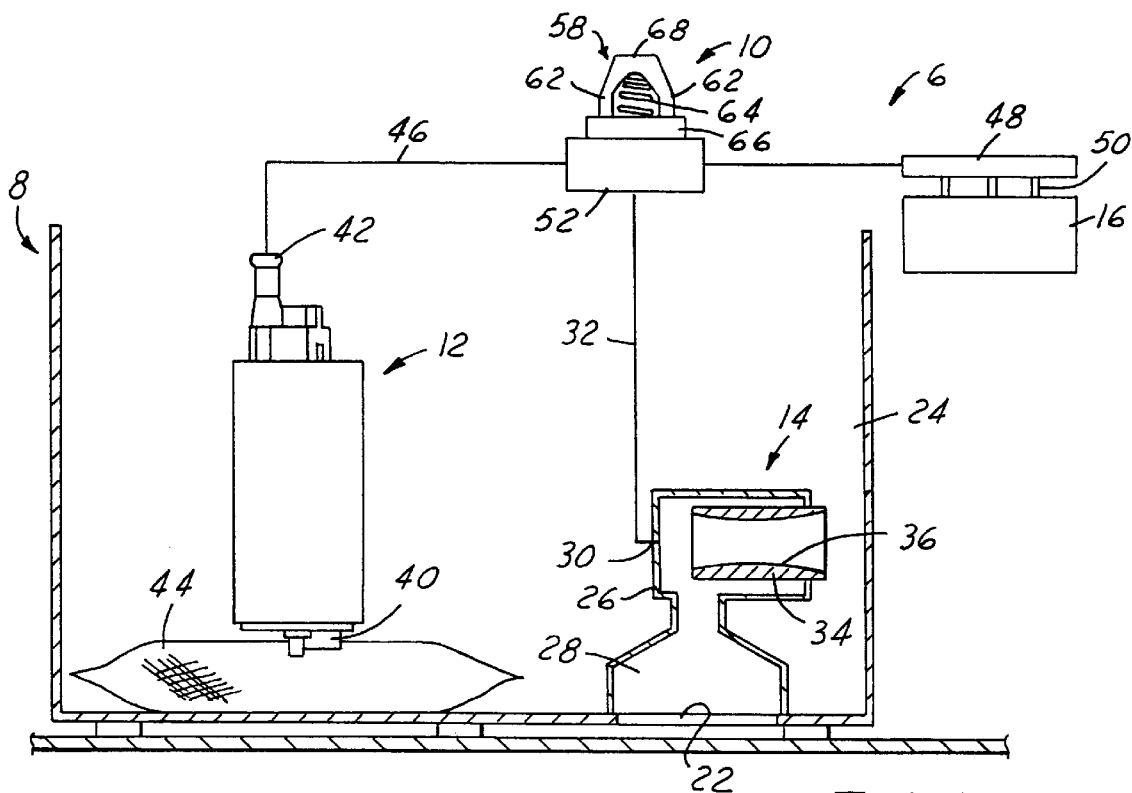
FIG. 1 is a diagrammatic view of a fuel system embodying the present invention.

Referring in more detail to the drawings, FIG. 1 illustrates a vehicle fuel system 6 with a fuel supply module 8 having a fuel pressure regulator 10 disposed downstream of a fuel pump 12 and upstream of a jet pump 14 to control the flow rate and maximum pressure of fuel delivered to an engine 16 and the flow of fuel to the jet pump 14. The fuel pump 12, jet pump 14 and fuel pressure regulator 10 are disposed within a fuel reservoir 24 within a fuel tank 20. Fluid flow through the jet pump 14 provides a pressure drop which draws fuel through an inlet 22 and discharges it into reservoir 24 so that fuel is available at an inlet 40 of the fuel pump 12.

The jet pump 14 has a housing 26 with a first, or low pressure inlet 28 communicating with and surrounding the inlet 22 of the reservoir 24 and through which fuel in the fuel tank 20 is drawn into the fuel reservoir 24. The housing 26 also has a second, or high pressure inlet 30 in communication with the fuel pressure regulator 10 through a conduit 32 through which pressurized fuel is routed to the jet pump 14. A venturi tube 34 is preferably press fit into the housing 26 and is constructed to receive the pressurized fuel which flows through the high pressure inlet 30. The venturi tube 34 has a reduced diameter portion or throat 36, and fuel flow therethrough creates a pressure drop within the jet pump housing 26 to draw fuel from the fuel tank 20 through the low pressure inlet 28 and into the reservoir 24. Fuel which flows through the venturi tube 34 is also discharged into the reservoir 24 and may thereafter be drawn into the fuel pump 12.

The fuel pump 12 draws fuel through its inlet 40, increases the pressure of the fuel and discharges fuel under pressure through an outlet 42 for delivery to the engine 16 and the jet pump 14 as controlled by the fuel pressure regulator 10. The fuel pump 12 may be of substantially any kind or construction capable of drawing fuel from the reservoir 24 and discharging fuel under pressure for delivery to the engine 16 such as a positive displacement type or gear rotor fuel pump such as disclosed in U.S. Pat. No. 4,697,995, or a turbine type fuel pump such as disclosed in U.S. Pat. No. 5,257,916, the disclosures of each of which is disclosed herein by reference in its entirety. Preferably, a fuel filter 44 surrounds the inlet 40 of the fuel pump 12 to remove contaminants from the fuel before it is drawn into the fuel pump 12. The outlet 42 of the fuel pump 12 is connected to a fuel line 46 through which fuel is delivered to a fuel rail 48 and injectors 50 of the engine.

The fuel pressure regulator 10 is connected to the fuel line 46 downstream of the fuel pump 12 through a T-fitting 52 so that its inlet 54 receives the pressurized fuel discharged from the fuel pump 12. The fuel pressure regulator 10 has a housing 56 comprising a cap 58 press fit over a body 60 and preferably ultrasonically welded or otherwise sealed thereto. The cap 58 and body 60 are typically molded and formed of a plastic material suitable for use in hydrocarbon fuels such as polyphenelene sulfide, nylon, acetal or other polymers. As best shown in FIG. 1, the cap 58 preferably has two or more spokes 62 defining bypass outlets 64 between them and interconnecting a rim 66 received over the body 60 and a central hub 68 which has a throughbore 70 in which a stop 72 is press fit. The body 60 has a generally annular cavity which defines the regulator inlet 54 and a throughbore which defines an outlet 74 communicated with the high pressure inlet 30 of the jet pump 14 by the conduit 32.

The housing 56 carries a diaphragm 80 which has a relatively thin and flexible central portion and a circumferentially continuous peripheral rib 82 received in a groove in the body 60 and retained therein by the cap 58 to provide fluid tight seals between them and the diaphragm 80. Preferably, to permit increased displacement of the diaphragm 80 it has a circumferentially continuous annular pleat or bellows 84 sized to permit, by gathering and ungathering thereof, full working travel of the diaphragm central portion. The diaphragm 80 is yieldably biased towards the body 60 by a spring 86 retained at its upper end by an annular shoulder 88 of the cap 58. The lower end of the spring 86 bears on a retainer 90 disposed between the spring 86 and the diaphragm 80. The retainer 90 has a radially outwardly extending flange 92 engaged by the spring 86 and an axially extending annular sidewall 94 defining a throughbore 96 of the retainer 90. The diaphragm 80 has a central opening 98 which opens into the throughbore 96 of the retainer 90.

Figure 2:
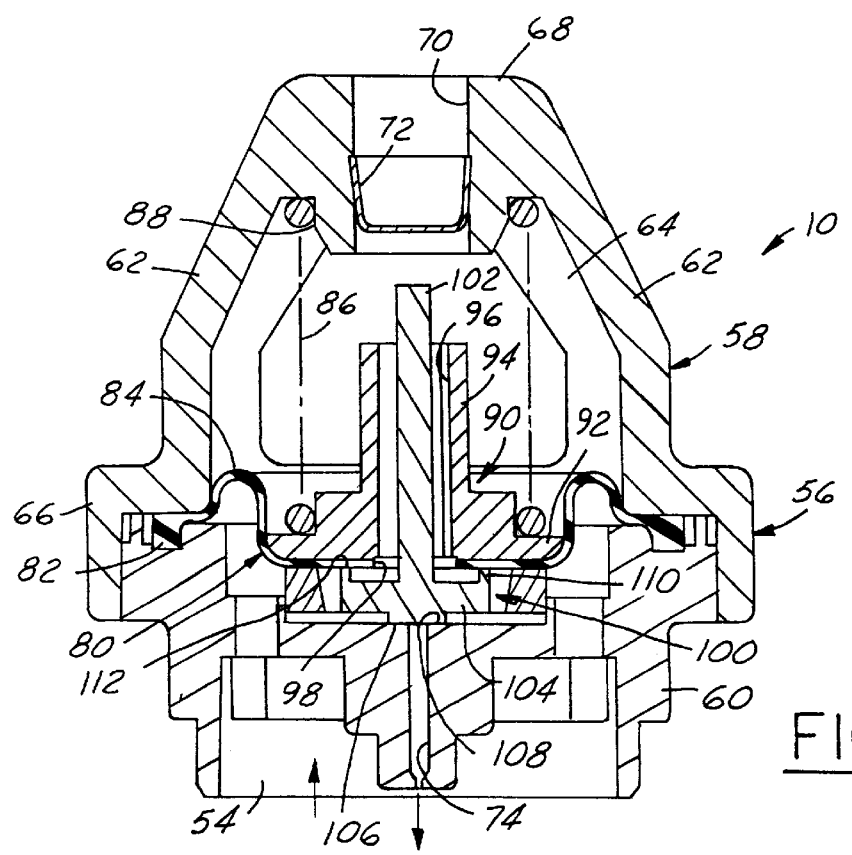
FIG. 2 is a cross sectional view of the fuel pressure regulator of FIG. 1 shown in a closed position.
Figure 3:
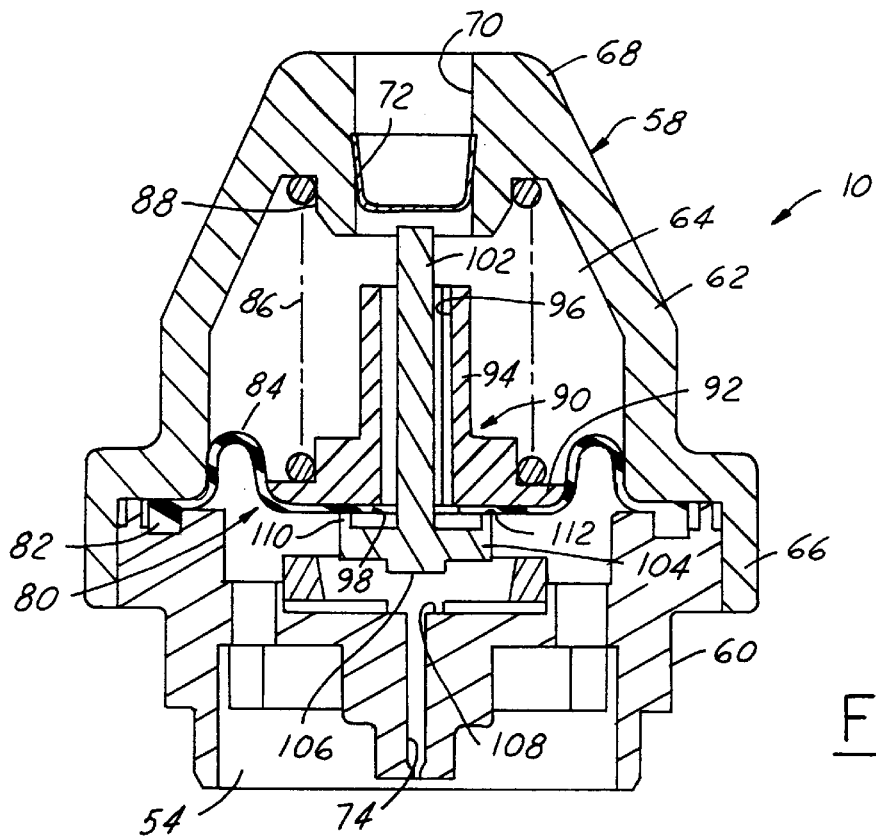
FIG. 3 is a cross sectional view of the fuel pressure regulator in an open position.

A valve 100 is slidably carried within the bore 96 of the retainer 90 and opening 98 of the diaphragm 80 and has a valve stem 102 and a valve head 104 with a first face 106 engageable with a valve seat 108 of the body 60 surrounding the outlet 74. The valve 100 is movable between a closed position (FIG. 2) with, the first face 106 engaged with the valve seat 108 to prevent fluid flow through the outlet 74 and an open position (FIG. 3) spaced from the valve seat 108 to permit fluid flow through the outlet 74 and to the jet pump 14. To selectively permit fluid flow from the regulator inlet 54 through the diaphragm opening 98, a raised annular rim 110 of a second face 112 of the valve head 104 is selectively engageable with the diaphragm 80 surrounding the opening 98. The second face 112 of the valve head 104 is normally held in contact with and against the diaphragm 80 by the pressure of fuel in the inlet 54 of the fuel pressure regulator 10 to prevent fuel flow through the diaphragm opening 98. The valve stem 102 is preferably elongate and extends through the diaphragm opening 98 and retainer bore 96. The valve 100 normally seals the diaphragm opening 98 and forms part of the working surface of the diaphragm 80.

Under normal operating conditions, the fuel pump 12 will supply fuel at a sufficient pressure and a flow rate which exceeds the maximum fuel demand of the engine. Under these conditions, the fuel at the inlet 54 of the fuel pressure regulator 10 will be at a high enough pressure to displace the diaphragm 80 and valve 100 away from the valve seat 108 of the body 60 to permit fuel to flow through the outlet 74 of the regulator 10 and to the high pressure inlet 30 of the jet pump 14. Even with this fuel flow to the jet pump 14, the fuel which continues through the fuel line 46 downstream of the fuel pressure regulator 10 is sufficient for the operation of the engine and supplied to the engine at a pressure controlled by the pressure regulator.

Figure 4:
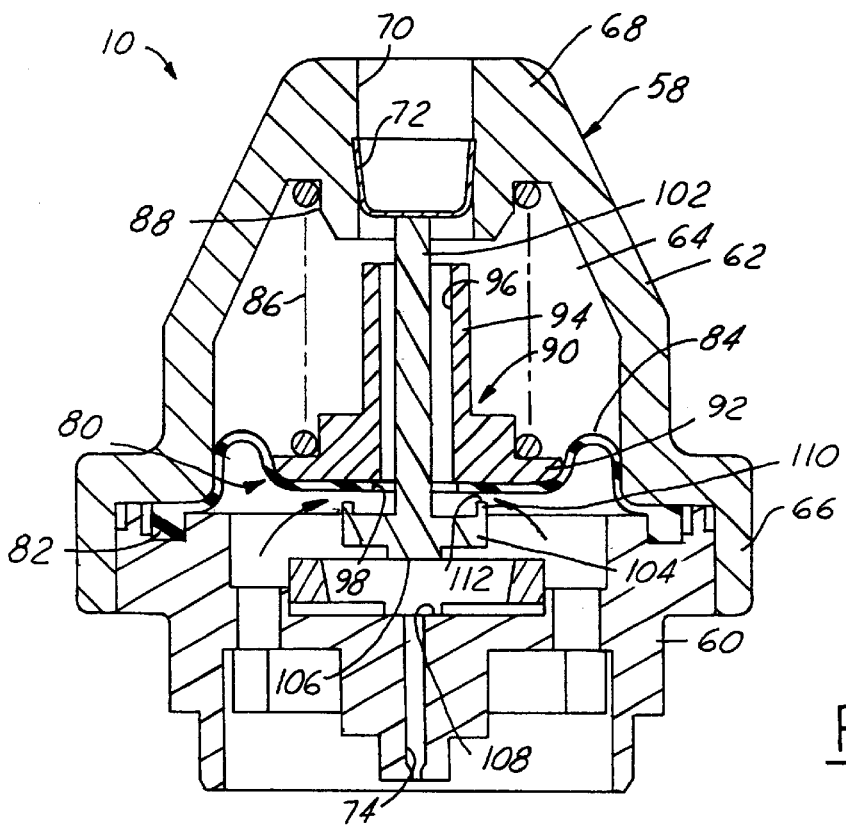
FIG. 4 is a cross sectional view of the fuel pressure regulator shown in its bypass position.

Preferably, to accommodate a sudden increase in fuel demand and to ensure an adequate fuel supply to the engine 16 even during high fuel demand conditions, the fuel pump 12 delivers fuel at a rate greater than needed for the operation of the engine 16 and the jet pump 14. To maintain the pressure of the fuel delivered to the engine 16 generally constant, fuel discharged from the fuel pump in excess of the engine's fuel demand and the jet pump fuel demand is bypassed by the fuel pressure regulator 10 to either the fuel tank 20 or the reservoir 24. Bypass fuel flow or fuel overpressure relief, such as to accommodate hot fuel expansion, occurs only when the rim 10 of the valve head 104 is disengaged from the diaphragm 80. As shown in FIG. 4, when an overpressure condition exists at the inlet 54 of the regulator 10, the diaphragm 80 will be displaced beyond the point where the valve stem 102 engages the stop 72 carried by the cap 58. Upward travel of the diaphragm 80 beyond this point causes the diaphragm 80 to separate from the second face 112 of the valve head 104 to permit fuel flow through the diaphragm opening 98, the bore 96 of the retainer 90 and into the cap 58. Fuel then flows back into the fuel tank 20 or reservoir 24 through the openings or bypass outlets 64 defined between the spokes 62 of the cap 58.

During low voltage conditions or other conditions wherein the fuel pump 12 discharges fuel at a lower than desired rate, the fuel pump 12 may not deliver sufficient fuel to operate both the engine 16 and the jet pump 14. In these situations, the fuel discharged from the fuel pump 12 and received at the inlet 54 of the fuel pressure regulator 10 will be insufficient to significantly, if at all, displace the diaphragm 80 and valve 100 relative to the valve seat 108 to at least substantially restrict the flow of fuel through the outlet 74 and to the jet pump 12. Thus, in these conditions, substantially all, if not all, of the fuel delivered from the fuel pump 12 is supplied to the engine 16 to ensure satisfactory operation of the engine 16. When the fuel pump 12 delivers a sufficiently high flow rate of fuel, the valve head 104 will be displaced from the valve seat 108 to permit fuel flow to the jet pump 14 to power the jet pump 14.

Thus, the fuel pressure regulator 10 controls the flow of fuel to the jet pump 14, the pressure of fuel delivered to the engine 16, and controls the pressure of fuel in the system, and limits the maximum pressure of fuel in the system by bypassing excess fuel delivered from the fuel pump 12. During low voltage conditions, for example, the parasitic fuel loss to the jet pump 14 is at least substantially reduced and may be eliminated, to provide to the engine 16 substantially all of the fuel delivered from the fuel pump 12. During other operating conditions, the regulator 10 permits fuel flow to the jet pump 14 to draw fuel into the reservoir 24.

What is claimed is:

1. A fuel pressure regulator, comprising:

a housing having an inlet constructed to communicate with an outlet of a fuel pump and an outlet constructed to communicate with a jet pump;

a valve carried by the housing and having a valve head engageable with a valve seat carried by the housing to prevent fluid flow through the outlet when the pressure of fuel at the inlet is below a predetermined threshold pressure and displaceable from the valve seat when the pressure at the inlet is above said predetermined threshold pressure to permit fluid flow from the inlet through the outlet to power the jet pump;

a diaphragm yieldably biased against the pressure of fuel at the inlet and which positions the valve head on the valve seat when the pressure of fuel at the inlet is below the threshold pressure and is displaceable by fuel at the inlet above the threshold pressure to permit the valve head to move away from the valve seat and fuel to flow through the outlet; and a bypass outlet of the housing, an opening through the diaphragm in communication with the bypass outlet and a second valve seat surrounding the opening through the diaphragm and constructed to be selectively engaged by the valve head to selectively communicate the inlet with the bypass outlet when the fuel pressure at the inlet is above a second threshold pressure.

2. The fuel pressure regulator of claim 1 wherein the valve head has a first face engageable with the valve seat adjacent to the outlet and a second face engageable with the second valve seat.

3. The fuel pressure regulator of claim 1 which also comprises a valve stem attached to the valve head and extending through the opening in the diaphragm and a stop carried by the housing to limit movement of the valve head away from the housing valve seat such that when the fuel pressure at the inlet is above the second threshold pressure, the diaphragm and valve head will be displaced causing the valve stem to engage the stop such that further displacement of the diaphragm separates the second valve seat from the valve head to permit fluid flow through the diaphragm opening and bypass outlet.

4. The fuel pressure regulator of claim 1 wherein the housing comprises a cap connected to a body which has a throughbore defining the outlet.

5. The fuel pressure regulator of claim 1 wherein the housing comprises a cap having at least one opening defining the bypass outlet, a body connected to the cap which has a throughbore defining the outlet and wherein the diaphragm is disposed generally between the body and the cap and with the valve, the diaphragm separates the inlet from the bypass outlet.

6. The fuel pressure regulator of claim 4 wherein the inlet is formed in the body of the housing.

7. The fuel pressure regulator of claim 1 which also comprises a spring which yieldably biases the diaphragm to yieldably bias the valve towards the valve seat carried by the housing.

8. A fuel system, comprising:

a fuel tank constructed to contain a supply of fuel;

a fuel pump module disposed within the fuel tank, defining a fuel reservoir and having an inlet through which fuel from the fuel tank may enter the fuel reservoir;

a primary fuel pump carried by the fuel pump module and having an inlet through which fuel is drawn from the fuel reservoir and an outlet through which fuel is discharged under pressure;

a fuel pressure regulator having an inlet in communication with the fuel pump outlet, an outlet and a valve responsive to fuel pressure at the regulator inlet and movable between an open position permitting fluid flow from the regulator inlet through the regulator outlet and a closed position at least substantially restricting fluid flow from the regulator inlet through the regulator outlet;

a secondary fuel pump having a first inlet in communication with the fuel pump module inlet, a second inlet in communication with the regulator outlet, an outlet in communication with the fuel reservoir, and a venturi passage communicating with the second inlet and the outlet and constructed to create a pressure drop at the first inlet in response to fluid flow therethrough to draw fuel into the fuel reservoir from the fuel tank, whereby when the pressure of fuel at the regulator inlet is below a threshold pressure, the valve is closed to prevent fluid flow through the regulator outlet and when the pressure at the regulator inlet is above the threshold pressure, the valve is moved to its open position to permit fluid flow through the regulator outlet and to the second inlet of the secondary fuel pump to provide a fluid flow through the venturi passage only when the pressure of fuel at the regulator inlet is above the threshold pressure;

a diaphragm carried by the fuel pressure regulator and yieldably biased against the pressure of fuel at the regulator inlet and which positions the valve head in its closed position when the pressure of fuel at the regulator inlet is below the threshold pressure and is displaceabe by fuel at the regulator inlet above the threshold pressure to permit the valve to move to its open position and fuel to flow through the outlet; and a bypass outlet of the fuel pressure regulator, an opening through the diaphragm in communication with the bypass outlet and a second valve seat surrounding the opening and constructed to be selectively engaged by the valve head to selectively communicate the regulator inlet with the bypass outlet when the fuel pressure at the regulator inlet is above a second threshold pressure.

9. The fuel system of claim 8 wherein the valve head has a first face constructed to prevent fluid flow through the regulator outlet when the valve is closed and a second face engageable with the second valve seat.

10. The fuel system of claim 8 which also comprises a housing of the fuel pressure regulator, a valve seat of the housing surrounding the fuel pressure regulator outlet, a valve stem attached to the valve head and extending through the opening in the diaphragm and a stop carried by the fuel pressure regulator housing to limit movement of the valve head away from the housing valve seat such that when the fuel pressure at the inlet is above the second threshold pressure, the diaphragm and valve head will be displaced until the valve stem engages the stop whereby further displacement of the diaphragm separates the valve head from the second valve seat to permit fluid flow through the diaphragm opening and bypass outlet.

11. The fuel system of claim 8 which also comprises a housing of the fuel pressure regulator having a cap with at least one opening defining the bypass outlet, a body connected to the cap which has a throughbore defining the outlet and wherein the diaphragm is disposed generally between the body and the cap and with the valve, the diaphragm separates the inlet from the bypass outlet.

12. The fuel system of claim 11 wherein the regulator inlet is formed in the body of the regulator housing.

13. The fuel system of claim 8 which also comprises a spring which yieldably biases the diaphragm to yieldably bias the valve towards its closed position.

14. A fuel pump module comprising:

a fuel reservoir;

an electric primary fuel pump having an inlet through which fuel is drawn from the fuel reservoir and an outlet through which fuel is discharged under pressure;

a fuel pressure regulator having a flexible diaphragm defining in part a fuel chamber, an inlet to the chamber communicating with the primary fuel pump outlet, a first outlet, a first valve responsive to fuel pressure at the regulator inlet and movable above a first threshold pressure at the inlet to an open position permitting fuel flow from the regulator inlet through the regulator first outlet and below the first threshold pressure to a closed position at least substantially restricting fluid flow from the regulator inlet through the regulator outlet, a second bypass outlet for discharging fuel from the fuel chamber, and a second valve responsive to the diaphragm to move to an open position permitting fuel flow through the second bypass outlet at a second threshold fuel pressure at the regulator inlet which is greater than the first threshold fuel pressure to regulate the pressure of fuel supplied by the primary fuel pump to an engine;

a secondary fuel pump having a first inlet through which fuel from a fuel tank may enter, a second inlet in communication with the regulator first outlet, an outlet in communication with the fuel reservoir, and a venturi passage communicating with the second inlet and the first outlet and constructed to create a pressure drop at the first inlet in response to fluid flow through the venturi passage to draw fuel into the fuel reservoir from the fuel tank, whereby when the pressure of fuel at the regulator inlet is below the first threshold pressure, the first valve is closed to prevent fluid flow through the regulator first outlet and when the pressure at the regulator inlet is above the first threshold pressure, the first valve is moved to its open position to permit fluid flow through the regulator first outlet and to the second inlet of the secondary fuel pump to provide a significant fuel flow through the venturi passage only when the pressure of fuel at the regulator inlet is above the first threshold pressure and when the fuel pressure at the regulator inlet is at the second threshold fuel pressure, the diaphragm opens the second valve to discharge fuel from the chamber through the second bypass fuel outlet to regulate the pressure of fuel supplied to the engine by the primary fuel pump.

15. A fuel pressure regulator for a fuel system having an electric primary fuel pump for supplying fuel to an engine and a secondary jet pump, comprising:

a housing;

a flexible diaphragm carried by the housing and defining in part a fuel chamber;

an inlet to the fuel chamber constructed to communicate with an outlet of the primary fuel pump;

a first outlet from the chamber constructed to communicate with a secondary fuel pump;

a first valve responsive to fuel pressure in the chamber and movable between a first closed position below a first threshold pressure in the chamber to at least substantially restrict fuel flow from the chamber through the first outlet to the secondary jet pump and a second open position above the first threshold pressure permitting fuel flow from the inlet chamber through the first outlet to the secondary jet pump;

a second bypass outlet for discharging fuel from the fuel chamber to the exterior of the regulator; and a second valve responsive to the diaphragm to move between a closed position inhibiting fuel flow from the inlet and chamber through the second bypass outlet and an open position at a second threshold fuel pressure in the chamber which is greater than the first threshold fuel pressure to permit fuel flow through the second bypass outlet to regulate the pressure of fuel supplied from the primary fuel pump to the engine.

16. The pressure regulator of claim 15 wherein the second valve comprises an opening to the diaphragm communicating with the second bypass outlet, a valve seat surrounding the opening through the diaphragm and a valve head which engages the valve seat to close the second valve when the fuel pressure in the chamber is below the second threshold pressure and is movable to disengage from the valve seat at the second threshold pressure to open the second valve to permit fuel flow through the second bypass outlet.

17. The fuel pressure regulator of claim 16 wherein the first valve comprises a second valve seat surrounding the first outlet from the chamber and the valve head engages the second seat to close the first valve when the pressure fuel in the chamber is below the first threshold pressure and disengages the second seat to open the first valve when the pressure of fuel in the chamber is above the first threshold pressure.

18. The fuel pressure regulator of claim 17 which also comprises a valve stem attached to the valve head and extending through the opening in the diaphragm and a stop carried by the housing to limit movement of the valve head away from the second valve seat so that when the fuel pressure in the chamber is at the second threshold pressure the valve head will be displaced from the second seat and the valve stem will engage the stop so that further displacement of the diaphragm separates the first valve seat from the valve head to permit fuel to flow through the diaphragm opening in the second bypass outlet to regulate the pressure of fuel supplied by the electric primary pump to the engine.

\* \* \* \* \*